(12) United States Patent
Strickland

(10) Patent No.: US 6,794,875 B2
(45) Date of Patent: Sep. 21, 2004

(54) INDUCTION WELL LOGGING APPARATUS AND METHOD

(75) Inventor: Robert W. Strickland, Austin, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/151,497

(22) Filed: May 20, 2002

(65) Prior Publication Data

US 2003/0229450 A1 Dec. 11, 2003

(51) Int. Cl.$^7$ .............................. G01V 3/10; G01V 3/18
(52) U.S. Cl. ..................... 324/343; 324/335; 324/339; 702/7
(58) Field of Search ................ 324/333–343, 324/303; 702/7–14

(56) References Cited

U.S. PATENT DOCUMENTS

| | | | | |
|---|---|---|---|---|
| 4,360,777 A | * | 11/1982 | Segesman .................. | 324/339 |
| 4,451,789 A | * | 5/1984 | Meador ..................... | 324/338 |
| 5,095,272 A | * | 3/1992 | Sinclair ..................... | 324/339 |
| 5,757,191 A | * | 5/1998 | Gianzero ................... | 324/339 |
| 5,781,436 A | * | 7/1998 | Forgang et al. ............ | 702/7 |
| 6,181,138 B1 | * | 1/2001 | Hagiwara et al. .......... | 324/338 |
| 6,218,841 B1 | * | 4/2001 | Wu ............................ | 324/338 |
| 6,393,364 B1 | * | 5/2002 | Gao et al. .................. | 702/7 |
| 6,483,309 B1 | * | 11/2002 | Gripshover et al. ........ | 324/331 |
| 6,584,408 B2 | * | 6/2003 | Omeragic ................... | 702/7 |

OTHER PUBLICATIONS

Moran, J.H. and Gianzero, S., "Effects of formation anisotropy on resistivity–logging measurements," Geophysics, vol. 44 No. 7 (Jul. 1979), pp. 1266–1286.*

Gianzero, S. and Su, S., "The response of an induction dipmeter and standard induction tools to dipping beds," Geophysics, vol. 55 No. 9 (Sep. 1990), pp. 1128–1140.*

* cited by examiner

Primary Examiner—N. Le
Assistant Examiner—Darrell Kinder
(74) Attorney, Agent, or Firm—Conley Rose, P.C.

(57) ABSTRACT

A coil arrangement and method of collecting and processing data in induction logging of wells is disclosed. The coil arrangement includes three essentially identical coils made of elliptical conductive loops lying in a plane tilted from the axis of the logging tool. Each coil is centered on the same point in space. Data are preferably collected by using the coil arrangement for both transmitter and receiver, and transmitting at three closely-spaced frequencies, one from each of the transmitter coils. The transmitted signals are received and recorded, at which time they are operated on mathematically to create rotation of an after-the-fact virtual sonde for measuring desired earth formation properties.

24 Claims, 11 Drawing Sheets

INDUCTION WELL LOGGING APPARATUS AND METHOD

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

This invention relates to induction well logging, and more particularly to a new transmitter and receiver coil structure, and a new method for collecting and processing data from an induction tool.

BACKGROUND OF THE INVENTION

Modern petroleum drilling and production operations demand a great quantity of information relating to parameters and conditions downhole. Such information typically includes characteristics of the earth formations traversed by the wellbore, in addition to data relating to the size and configuration of the borehole itself. The collection of information relating to conditions downhole, which commonly is referred to as "logging," can be performed by several methods. Oil well logging has been known in the industry for many years as a technique for providing information to a petrophysicist regarding the particular earth formation being drilled. In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface. In accordance with conventional techniques, various parameters of the earth's formations are measured and correlated with the position of the sonde in the borehole, as the sonde is pulled uphole.

The sensors used in a wireline sonde usually include a source device for transmitting energy into the formation, and one or more receivers for detecting the energy reflected from the formation. Various sensors have been used to determine particular characteristics of the formation, including nuclear sensors, acoustic sensors, and electrical sensors.

If the formation properties are needed while drilling, sensors can also be deployed near the end of a drilling string. Measurements of formation properties can be measured and stored in memory for later retrieval and correlation with depth. Measurements can also be transmitted to the surface by pulses of mud pressure or other means. This process is referred to as "logging while drilling" (LWD).

For a formation to contain petroleum, and for the formation to permit the petroleum to flow through it, the rock comprising the formation must have certain well-known physical characteristics. Hydrocarbons are a poor conductor of electricity while most formation water conducts much better. If the porosity of an earth formation is known from other sensors, its electrical resistivity can assist the petrophysicist in determining the volume fraction of hydrocarbons in the formation. This electrical resistivity can be measured by two classes of sensors—those that use electrodes to force current to flow through the formation and to measure potential differences, and those that use coils to induce currents to flow magnetically. The particular type with coils, called induction devices, determine electrical resistivity by inducing an alternating electromagnetic field into the formation with a transmitter coil arrangement. The electromagnetic field induces alternating electric (or eddy) currents in the formation in paths that are substantially coaxial with the transmitter. These currents in turn create a secondary electromagnetic field in the medium, inducing an alternating voltage at the receiver coil. If the current in the transmitter coil is kept constant, the eddy current intensity is proportional to the conductivity of the formation. Consequently, the conductivity of the formation determines the intensity of the secondary electromagnetic field, and thus, the amplitude of the voltage at the receiver coil. As will be apparent to one skilled in the art, the propagating electromagnetic wave suffers both attenuation and phase shift as it traverses the formation.

An exemplary induction tool is shown in the prior art drawing of FIG. 1, in which one or more transmitters (T) and a plurality of receivers ($R_i$) are shown in a logging sonde. Each transmitter or receiver is a set of coils, with modern array induction tools having several receivers of increasing transmitter-to-receiver spacing to measure progressively deeper into the formation.

In a conventional induction tool such as that shown in FIG. 1, the coils are wound coaxially around a cylindrical mandrel. Both transmitter coils and receiver coils are solenoidal, and are wound coaxial with the mandrel. Such coils would therefore be aligned with the principal axis of the logging tool, which is normally also the central axis of the borehole and is usually referred to as the z axis. That is, the magnetic moments of the coils are aligned with the axis of the mandrel on which they are wound. The number, position, and numbers of turns of the coils are arranged to null the signal in a vacuum due to the mutual inductance of transmitters and receivers.

During operation, an oscillator supplies alternating current to the transmitter coils, thereby inducing voltage in the receiver coils. The voltage induced in the receiver coils results from the sum of all eddy currents induced in the surrounding formations by all transmitters. Phase sensitive electronics measure the receiver voltage that is in-phase with the transmitter current divided by magnitude of the transmitter current. When normalized with the proper scale factor, this gives the apparent conductivity of the formation. The out-of-phase component can also be useful because of its sensitivity to skin effect although it is less stable and is adversely affected by contrasts in the magnetic permeability.

As noted, the induced eddy currents tend to flow in circular paths that are coaxial with the transmitter coil. As shown in FIG. 1, for a vertical borehole traversing horizontal formations, there is a general symmetry for the induced current around the logging tool. In this ideal situation, each line of current flow remains in the same formation along its entire flow path, and never crosses a bed boundary.

In many situations, as shown for example in FIG. 2, the wellbore is not vertical and/or the bed boundaries are not horizontal. The well bore in FIG. 2 is shown with an inclination angle θ measured relative to true vertical. A bed boundary between formations is shown with a dip angle α relative to the axis of the borehole. The inclined wellbore strikes the dipping bed at an azimuth angle β. As a result, the induced eddy currents flow through more than one medium, encountering formations with different resistive properties. The resulting logs tend to be relatively inaccurate, especially as the dip angle α of the bed boundaries become more severe. If the logging tool traverses a thin bed, the problem becomes even more exaggerated.

As shown in the graph of FIG. 3A, an induction sonde traversing a dipping bed produces a log with "horns." The more severe the dip angle, the less accurate is the measurement. FIG. 3A represents a computer simulation of a log that would be generated during logging of a ten foot thick bed (in actual depth), with different plots for different dip angles. FIG. 3B shows a computer simulation of a log which would be generated if the thickness of the bed were true vertical depth, with different plots for different dip angles. As is evident from these simulated logs, as the dip angle increases, the accuracy and meaningfulness of the log decreases. In instances of high dip angles, the plots become virtually meaningless in the vicinity of the bed boundaries.

Formation anisotropy further complicates the interpretation of conventional induction tools. There are at least two major interpretation problems related to anisotropy. The first is in interpreting logs from a number of wells drilled from a common platform. Each well path intercepts the zone of interest at a different angle of relative dip. If the zone is anisotropic in resistivity, the zone will have a different measured resistivity that is a function of dip angle. This effect is present in thick beds. In thin beds, the problem is compounded with the polarization horns at boundaries and the change in spatial response with dip angle.

The second problem is the case of finely laminated sand/shale sequences. This is the so-called low resistivity pay problem. These zones can be productive if the thin, sand layers are saturated with oil. When water wet, the sands are electrically conductive and similar in conductivity to the shale, so the formation is reasonably isotropic. If the sands are saturated with oil, they act as insulators separating the conductive shale layers. Measured horizontally along the layers, the insulating oil layers are electrically in parallel with the conducting shale layers, and the shale conductivity dominates. The conductive shale layers "short out" the resistive sand layers. Measured vertically across the stack of layers, the layers are electrically in series, and the high resistivity of the sand layers dominates. A conventional tool that measures only the horizontal resistivity will give a poor estimate of the oil saturation of the composite since it predominately sees the low resistivity of the shales. A tool that measures both components can better estimate the saturation. Therefore, it is desirable to measure formation anisotropy even in situations of low relative dip. Of course, relative dip further complicates this interpretation problem.

Many efforts have been made to develop induction well logging equipment and methods of operation to measure characteristics of materials surrounding well bores while avoiding these known problems, and various devices have been developed to measure the dip angle of bed boundaries to give more meaning to the logs. For example, it has been appreciated that the accuracy of induction logs could be improved if it were possible to keep the transmitter coil and receiver coils parallel to the bed boundaries (and also with each other). To accomplish this, it is known to provide separate transmitters and receivers, with each transmitter and receiver being comprised of an array of three separate coils. One of these three coils is aligned with the principal axis of the logging tool and therefore is aligned with the well. The other two are positioned perpendicular to the tool axis and to each other, such as is generally shown in FIG. 5. Due to the physical constraints of the space available in the logging tool, these additional coils cannot be of the same size and shape as the main coil wound on the mandrel. However, to facilitate measurements, the three coils are centered on the same point such as shown in FIG. 6. The vertical coil of FIG. 6 is simply wound around the mandrel as in the classic non-steerable tools. The horizontal coil is formed of a pair of saddle shaped coils placed on the surface of the mandrel. Another horizontal coil may be placed at right angle to the one illustrated to complete a triad.

The transmitter and receiver arrays may be selectively driven to create a virtual sonde, with the virtual coil arrays parallel to the bed boundaries to produce magnetic moments that are orthogonal to the bed boundaries. See generally U.S. Pat. No. 5,757,191 to Gianzero (incorporated herein by reference for all purposes). The coils are also steered to create a virtual transmitter and receiver perpendicular to the bedding planes to measure anisotropy. For example, FIG. 17 shows the effect of steering the array of coils to effect virtual transmitters and receivers that are parallel to the bedding planes to measure formation resistivity. Similarly, U.S. Pat. No. 4,360,777, issued to Segesman on Nov. 23, 1982, (incorporated herein by reference for all purposes) discloses an electronically steerable transmitter and receiver coil arrangements which allow the induced current loops to be aligned with the layered formations surrounding a well. Segesman adjusts the phase and amplitude of transmitter signals to the three transmitter coils to generate a composite transmitted signal which is aligned with the formations surrounding the well. See also Gianzero, S. and Su, S. M., "The Response of an Induction Dipmeter and Standard Induction Tool to Dipping Beds," *Geophysics*, Vol. 55, No. 9 (September 1990). Similarly, other devices have been developed to measure the strike angle between the wellbore and the bed boundary.

However, despite the usefulness of virtual sondes, problems still exist with these arrangements. For example, the non-planar windings of the saddle shaped coils of FIG. 5 cause field assymetries which could complicate the beam steering methods taught by Segesman and Gianzero. Also, the mechanical arrangement of the triads of coils makes them tedious to manufacture and install and can substantially weaken the device. Further, to create a virtual sonde that includes coils parallel and perpendicular to the bed boundaries, it is necessary to determine the angle of any bed boundary prior to driving the transmitter and receiver coils. The logging process requires repeated measurements of dip and adjustment of the virtual sonde angle, thus slowing the process. This also presents difficulties if the dip angle of the bed boundary is measured inaccurately.

BRIEF SUMMARY OF THE INVENTION

The invention includes a new coil arrangement and method for performing induction logging of wells. Each coil arrangement comprises three separate coils each having one or more conductive loops, with each loop lying substantially in a plane tilted substantially from the principal axis of a logging tool. The three coils are positioned symmetrically about the axis of the logging tool and centered on about the same point. The arrangement places the axes of each of the three coils in orthogonal relationship to the other two.

The invention also includes an improved logging method. A set of coils is used to transmit a set of induction logging signals. At each desired receiver location, one or more coil arrangements are used to receive and record each of the three transmitted signals, for a typical total of up to nine signals. The recorded data may then be mathematically operated on to "steer" a virtual induction sonde after the data has been taken. This allows measurement of any of the properties of materials surrounding the borehole which have been measured by prior known induction logging tools.

BRIEF DESCRIPTION OF THE DRAWINGS

For a more detailed understanding of the invention, reference will now be made to the Figures, wherein.

DETAILED DESCRIPTION OF THE INVENTION

Figure 1:
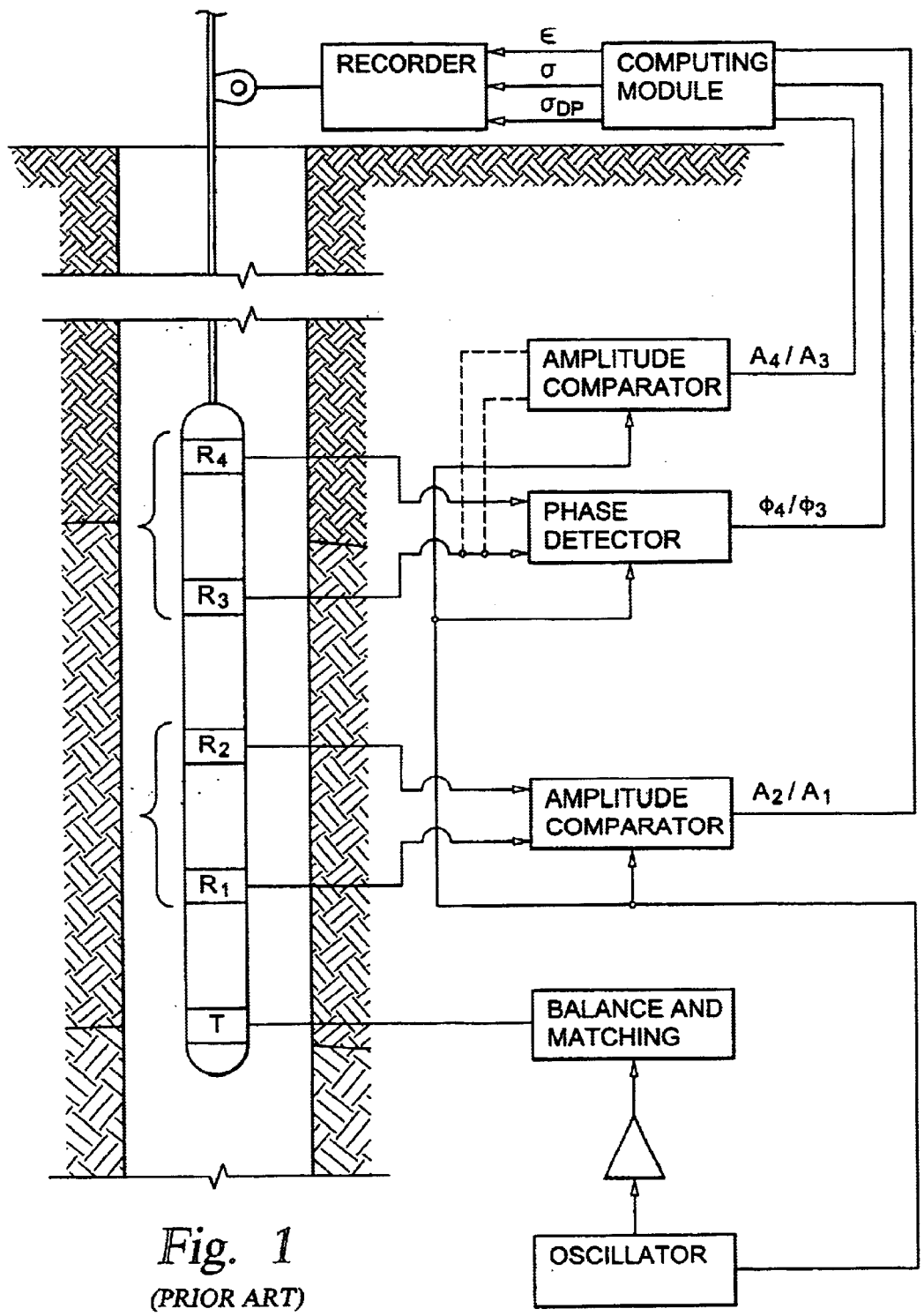
FIG. 1 is an illustration of a prior art induction logging system.
Figure 2:
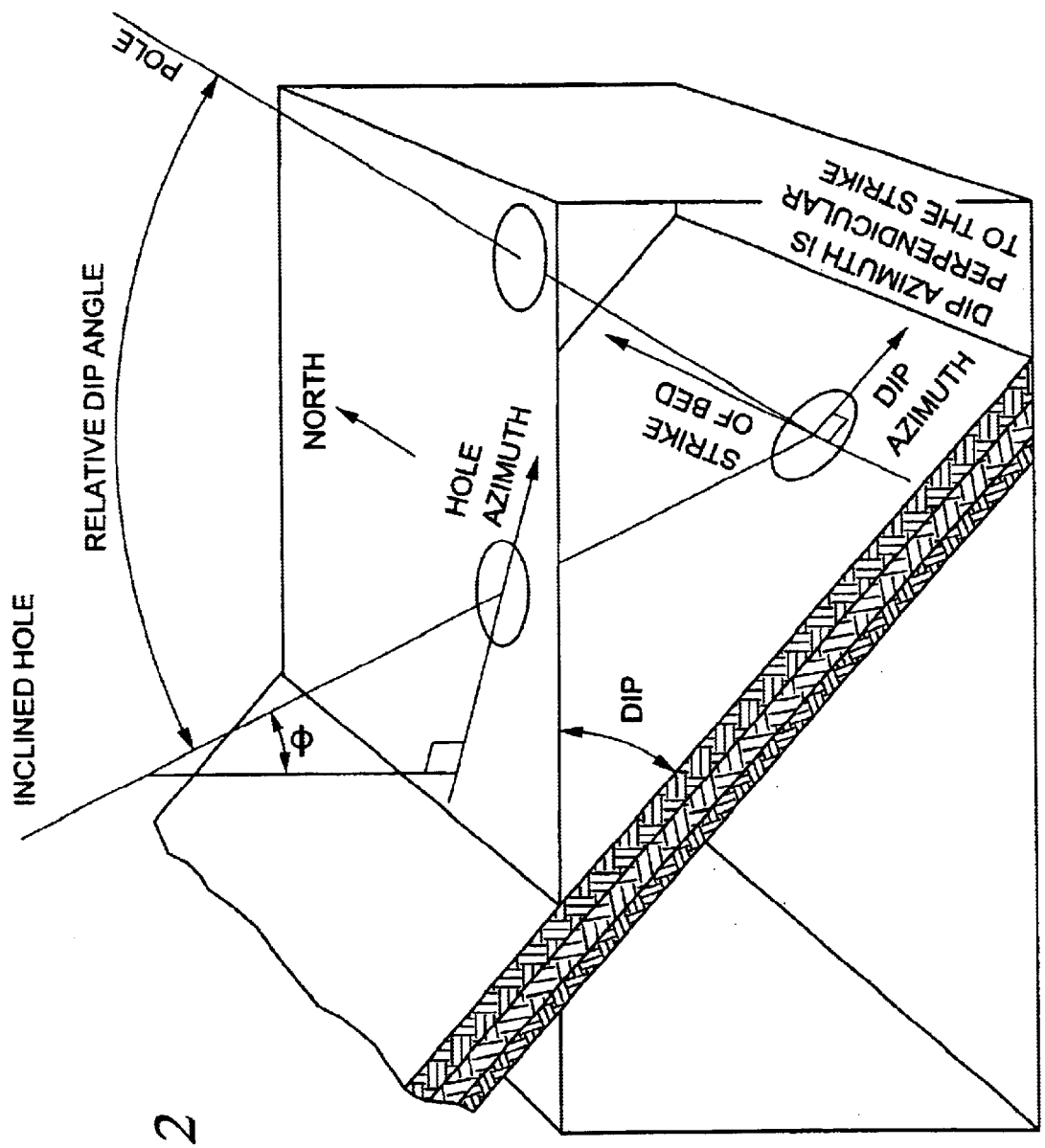
FIG. 2 is an illustration of a wellbore being drilled through a dipping bed formation in accordance with typical drilling practices.
Figure 3A:
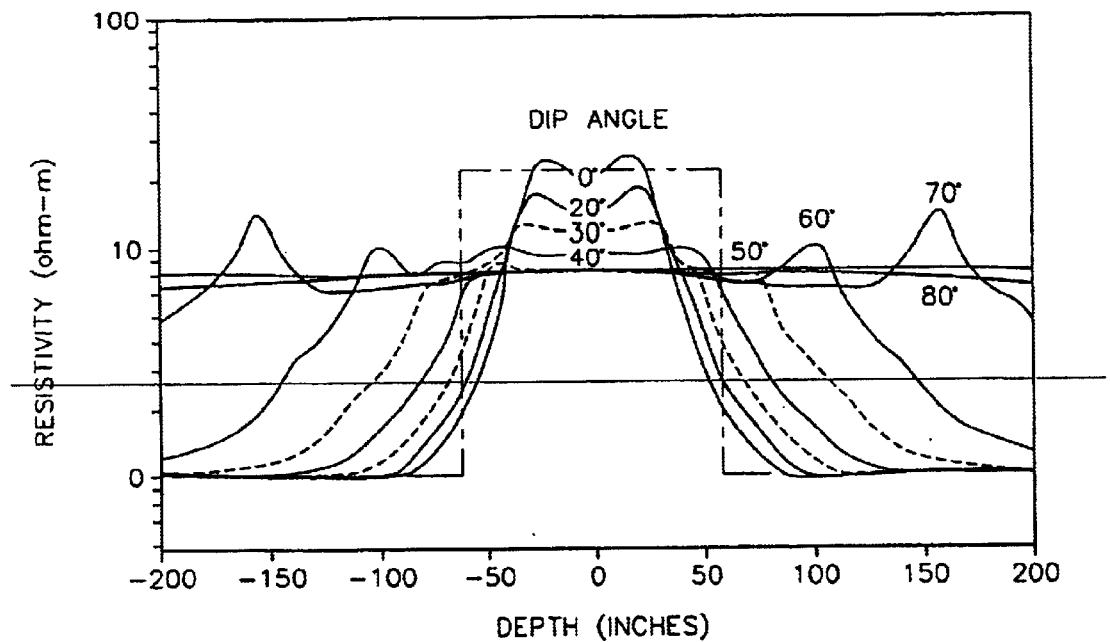
FIGS. 3A–3B depict resistivity logs obtained in dipping bed formations using the induction sonde of FIG. 1.
Figure 3B:
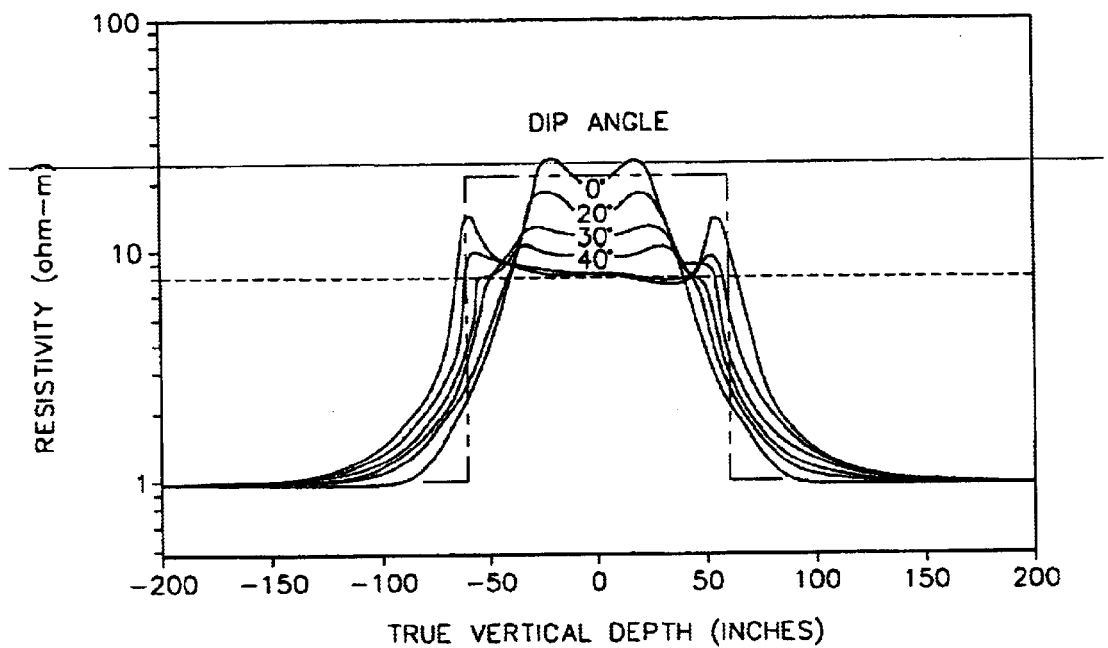
Figure 4:
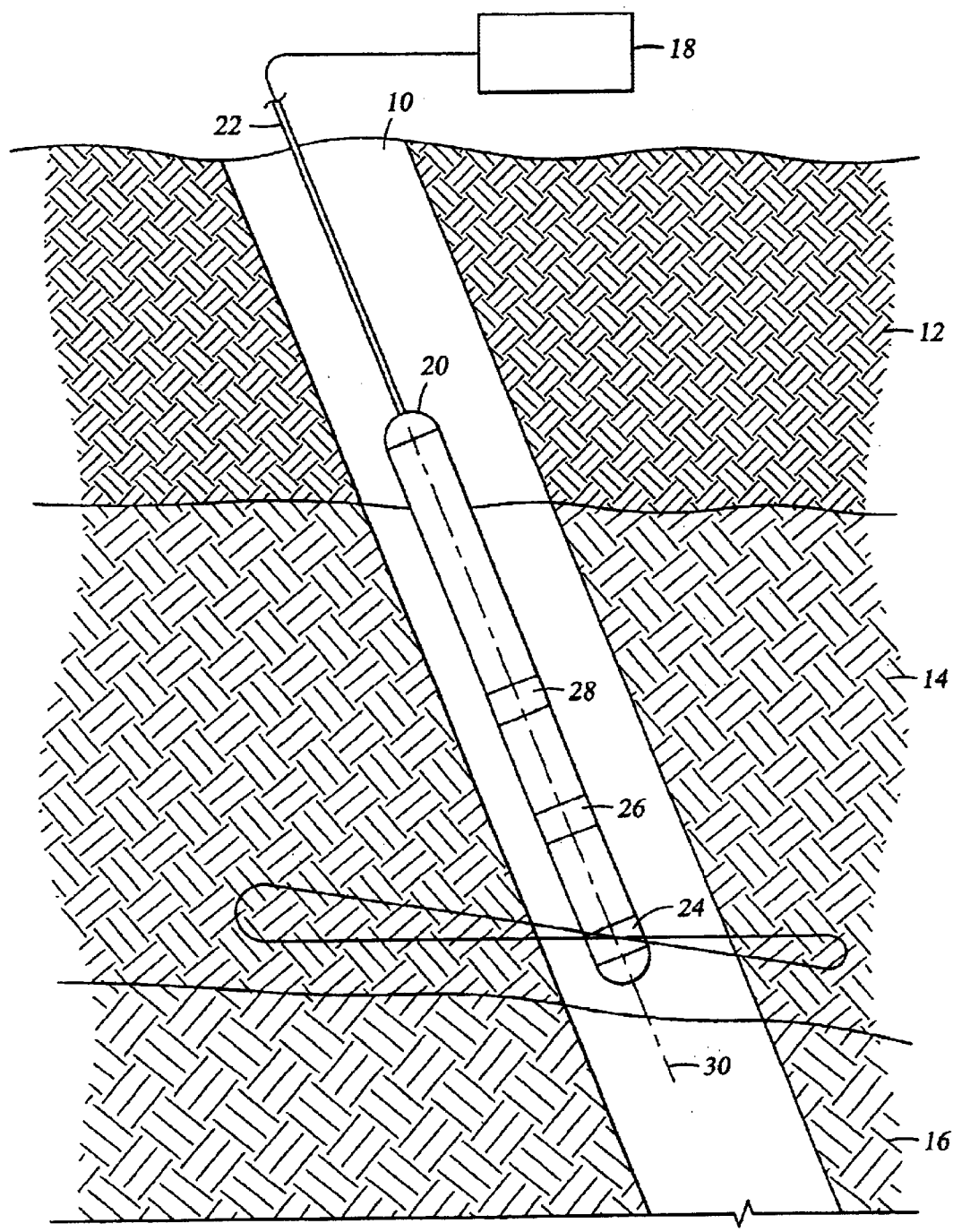
FIG. 4 is an illustration of a logging sonde in a slanted borehole with the transmitter steered to align the transmitted signal with the earth layers.

With reference to FIG. 4, the general arrangement of an induction logging tool in accordance with the invention in a well logging application will be described. A borehole or well 10 is drilled through several earth layers 12, 14, and 16. A logging sonde 20 is suspended within borehole 10 by a logging cable 22. Cable 22 provides mechanical support for the sonde 20 and contains suitable electrical conductors to provide power to the sonde 20 and to transmit control signals from equipment 18 at the surface of the earth to the sonde and to transmit collected data from the sonde to suitable recording media in equipment 18. The invention is also susceptible to an LWD application.

The tool 20 is shown with three coil arrangements 24, 26, and 28. Coil 24 may be used to transmit logging signals and coils 26 and 28 may be used to receive signals. Only one receiving coil 26 is required for a functional device, but induction logging tools typically have two or more receiver coil arrangements because the distance between the transmitter and receiver coils affects the depth of the measurement and other parameters of the system.

Figure 8:
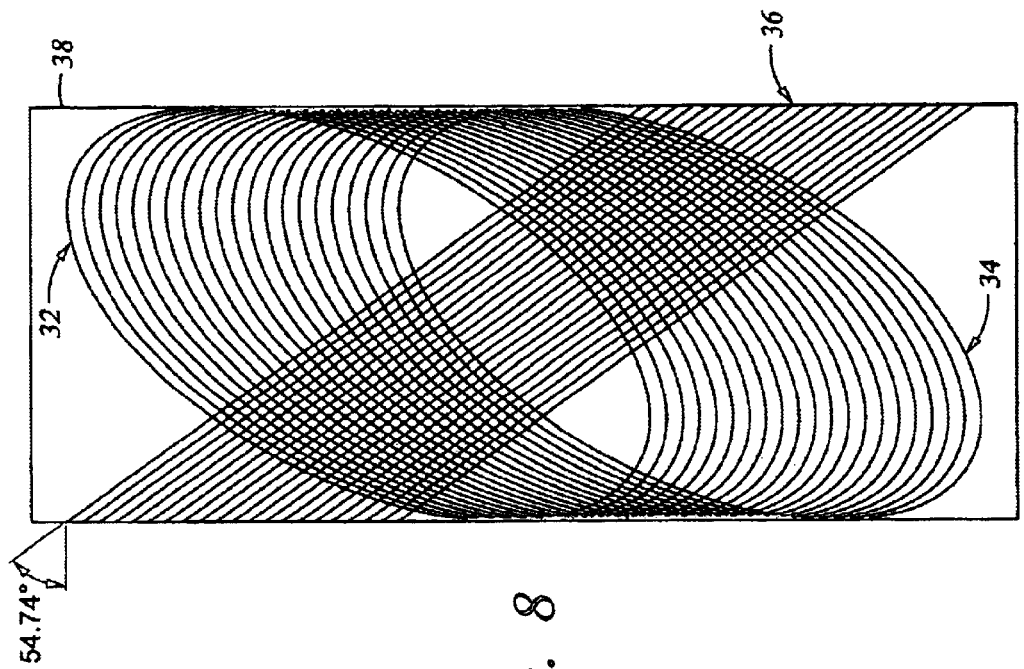
FIGS. 7 through 11 show various views of a coil arrangement according to the present invention.

A preferred coil arrangement for one embodiment of the invention is shown in FIGS. 7 through 11. Three multi-turn coils 32, 34, and 36 make up a triad wrapped around the surface of a cylinder, such as an insulating mandrel 38. The three coils 32, 34, 36 are preferably substantially identical. Each coil 32, 34, 36 is formed of one or more loops of wire or other conductor with each loop lying substantially in a plane tilted from the central axis of the cylinder, and therefore from the principal axis of a logging tool. The coils are positioned at 120 degree spacings about the axis of the cylinder, and therefore the logging tool, and are centered on substantially the same point in space. As illustrated in FIG. 8, the coils may be tilted at an angle of 54.74 degrees from the principal axis of the tool. At this angle the magnetic moments of the three coils are precisely perpendicular to each other and therefore orthogonal.

Figure 7:
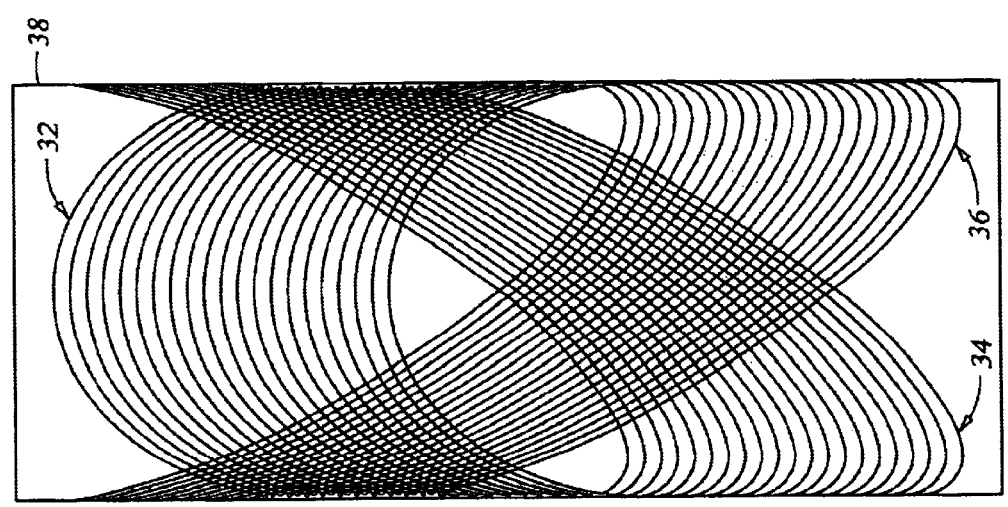

FIGS. 7 and 8 show two side views of an insulating mandrel with a triad, i.e. three, multi-turn coils 32, 34 and 36. FIG. 8 is the view of FIG. 7 rotated thirty degrees about the vertical axis. FIG. 8 shows coil 36 edge-on so each winding appears as a diagonal line. This demonstrates that each winding is flat. To eliminate clutter in the sketch, each coil is shown as a stack of filamentary current loops. In practice, the wires have finite diameter, and each loop is broken and connected to its neighbor by a diagonal jog so that the loops may be wound in series.

Figure 10:
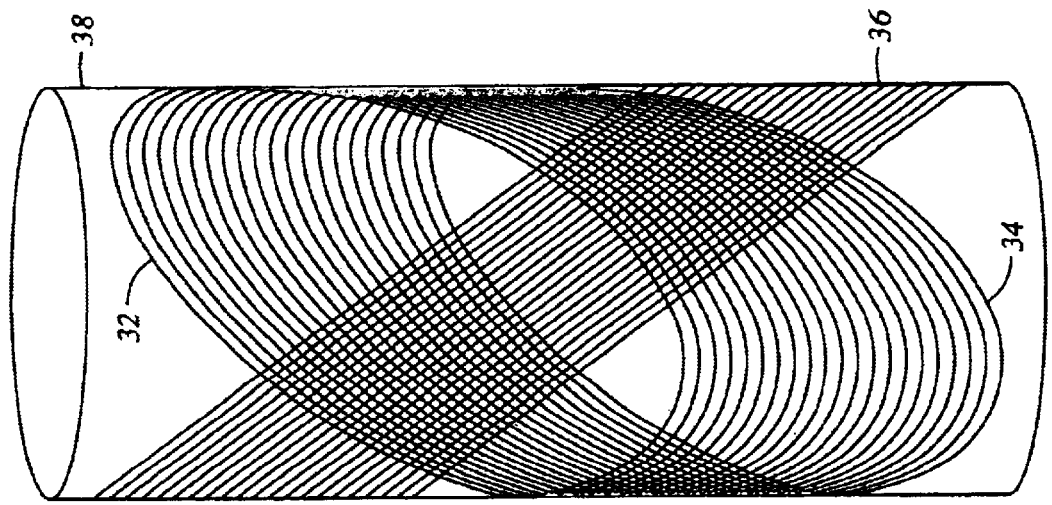
Figure 9:
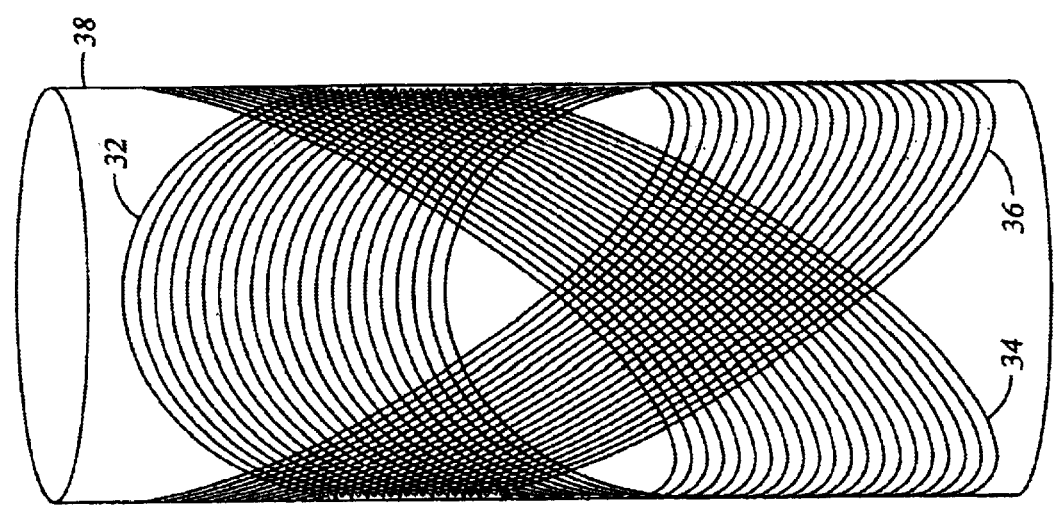
Figure 17:
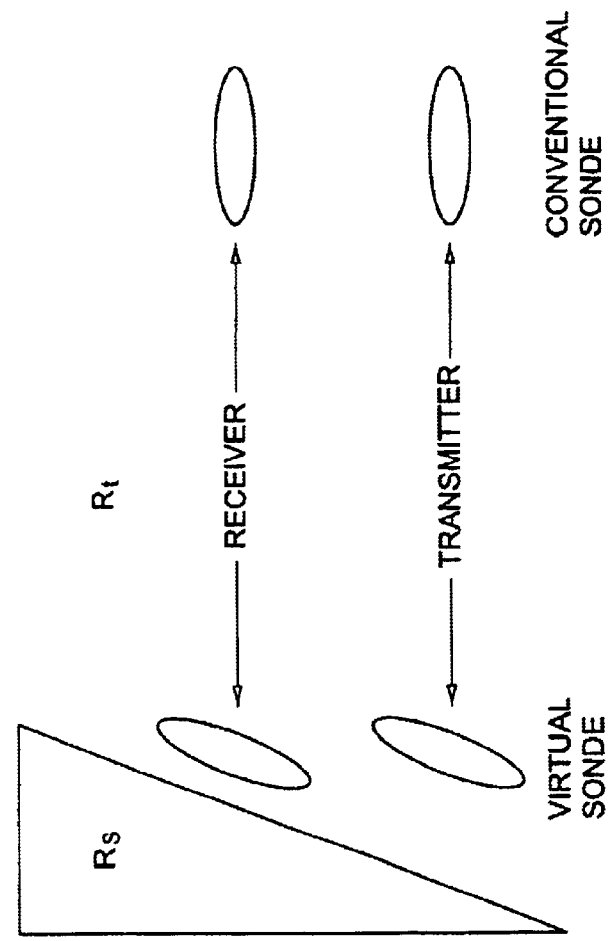
FIG. 17 is an illustration showing a steered virtual induction sonde.
Figure 11:
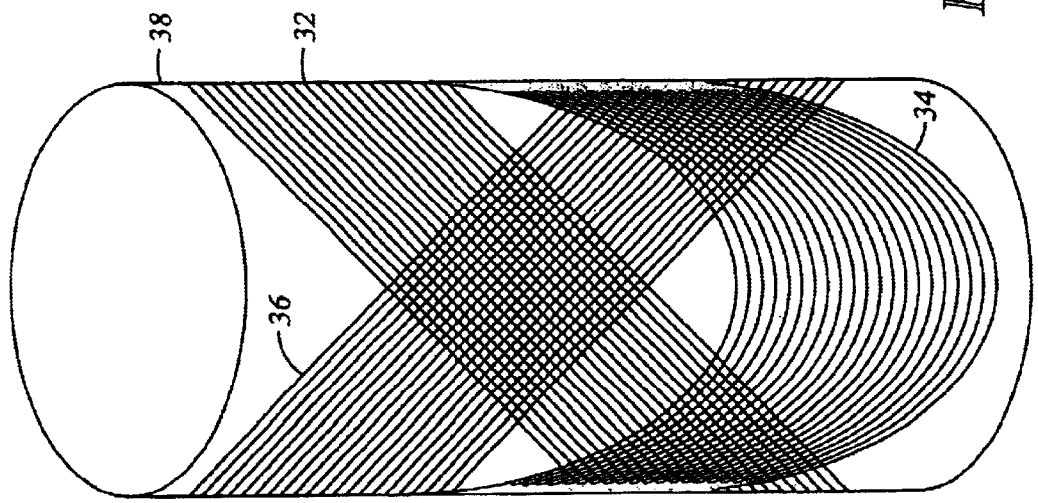

It is also instructive to view the triad of coils obliquely as shown in FIGS. 9, 10 and 11. FIG. 9 is a view of the coils in FIG. 7, but tilted slightly. FIG. 10 is similar to FIG. 8, but tilted slightly toward the viewer. In FIG. 11, the triad is tilted more and rotated so the viewer is looking edge-on to two sets of windings. The viewer is looking along a line perpendicular to the third set of windings. From this vantage, it is obvious that two sets of windings are both flat and meet at right angles. It is also clear that each winding is a large ellipse. If one were to rotate the triad 120 degrees about its axis, the resulting picture would be identical, so the planes of each of the three sets of windings meet at right angles.

Clearly, with this arrangement the three planes parallel to each of the three sets of windings are mutually perpendicular. Unlike the vertical arrangements of Gianzero and Segesman, the tilted arrangement allows each of the three sets of windings to be flat and be as large as possible. The area of each winding is larger than that of the cross section of the mandrel. This results in more signal strength than the vertical arrangements of the prior art. Furthermore, the tilted arrangement is symmetrical. Each of the three coils has exactly the same size and shape, so the field produced by each will be identical in distribution but rotated 120 degrees about the axis of the mandrel. Unlike the vertical arrangement, each turn of each coil can be planar and extend across the full cross section of the mandrel.

The sensitivity of an induction tool goes as the product of the areas of the transmitter and receiver coils. Each turn is an ellipse with its major axis larger than its minor axis by a factor of the square root of three. Since the area of an ellipse with major axis a and minor axis b is $\pi ab/4$, the resulting signal strength will be three times as great as if the coils were round and equal in diameter to the mandrel. Any other arrangement would reduce either the effective area of the coils, reduce the mechanical strength, or produce an asymmetrical response. The tilted orthogonal arrangement is ideally suited to the cylindrical geometry of the borehole.

The coil arrangement could be constructed in several ways. One way would be to mill a round-bottomed groove for each turn into an insulating mandrel. The radius of the groove should be equal to the radius of the litz wire used to wind the coil. The center of the circle of the groove would trace an elliptical path around the mandrel. Longitudinal slots would allow each winding to make a jog to the next groove. By displacing the coils by about one wire diameter, the grooves could be made deeper on one side than the other allowing each winding to pass under its neighbor on one side and over its neighbor on the other side. In this and other practical embodiments, the loops of the coils will not lie exactly in a plane and the coils will not be centered on exactly the same point due to the need to overlap coils and interconnect the individual loops forming each coil.

Figure 12:
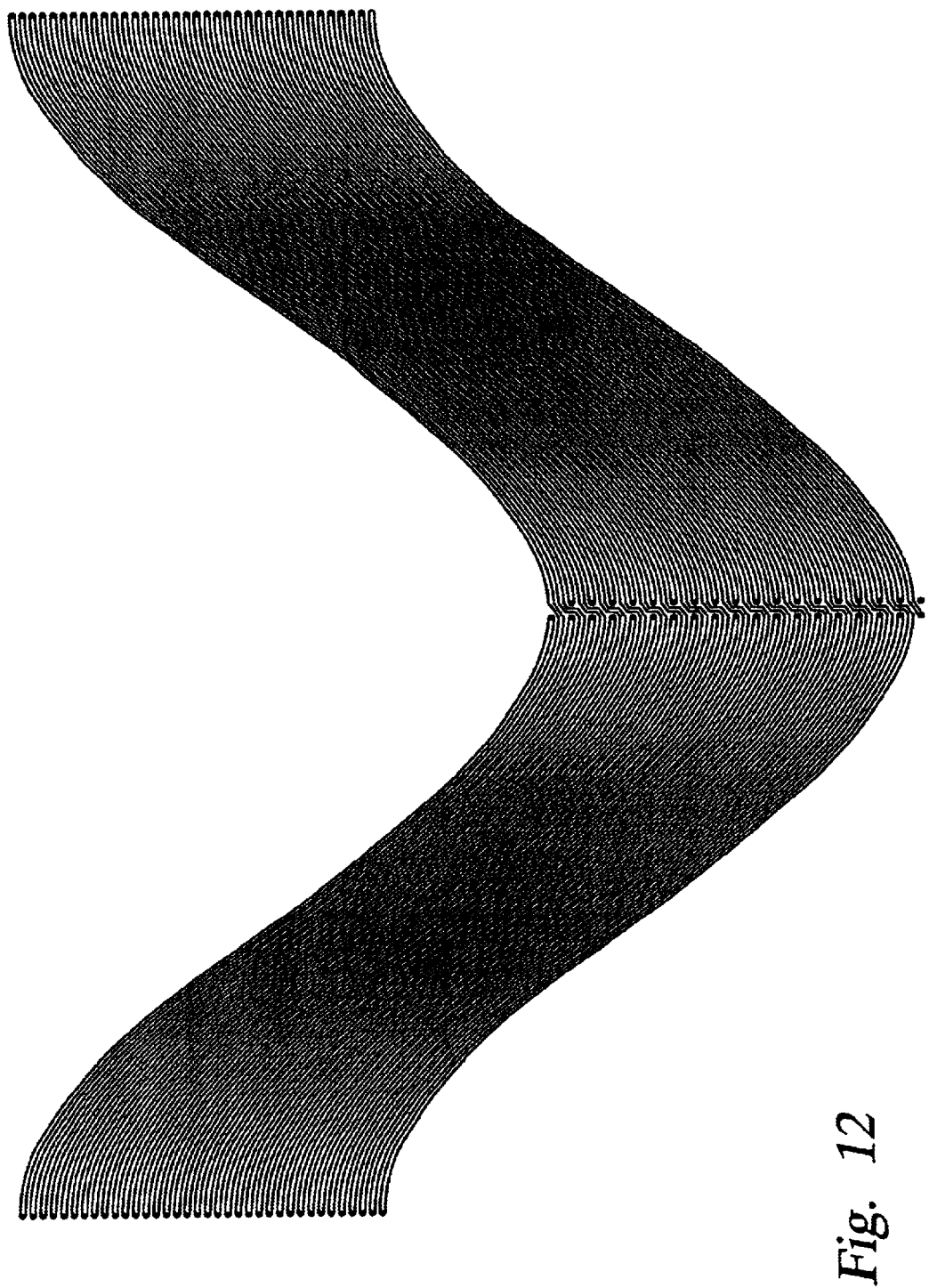
FIG. 12 illustrates a printed wiring board pattern embodiment of coils according to the present invention.

Another method of implementing the triads is to use flexible printed wiring board (PWB) technology instead of wire. The traces of the printed wiring board form the windings of the coil. When unwrapped and laid flat, each elliptical winding forms a sinusoidal curve on the flat PWB. FIG. 12 shows the top side of such a PWB. The back side of the same board contains the vias and jogs needed to connect every other turn in series from one end of the coil to the other. The skipped turns are picked up coming back the other way so that all of the turns are connected, and both coil connections are made at the same end of the coil. The PWB must be wrapped around the mandrel to form a tube so that the left and right columns of vias overlay. Each via must be soldered to its mate at the overlap. Three such flexible circuits can be positioned 120 degrees apart and "woven" together to form a triad. If each coil is sufficiently short, at most two coils will overlap at any point.

All three coils may also be printed on a single two sided flexible printed wire board. Whether using a separate PWB for each coil or placing all three on a single PWB, it is desirable to slightly adjust the physical length of the coils which will be positioned on the outer surface to compensate for the finite thickness of the PWB.

An improved logging tool according to a preferred embodiment of the present invention uses at least one of the coil arrangements of FIG. 7 for each transmitter and receiver in the tool. For example, in FIG. 4, one coil arrangement may be used for transmitter 24 and two each may be used for receiver coils 26 and 28. The second coil at each location 26 and 28 would be used as a bucking coil as is known in the art.

The improved coil arrangement of the preferred embodiment can be operated as a conventional tool that had only a single vertically oriented coil at each transmitter and receiver location. This can be done by driving the three coils of the transmitter arrangement with signals that are identical in frequency, amplitude and phase. The composite transmitted signal will be identical to that transmitted by a single vertically oriented coil. In similar fashion, the receiver can sum the signals from the three receiver coils with the same gain for each coil to generate a signal equivalent to that of a single vertical coil. This works because the coils are essentially identical in shape and size and are oriented symmetrically about the principal axis of the logging tool.

Alternately, beam steering techniques (such as those contained in the above-referenced Segesman and Gianzero patents) may be used with the coil arrangement of the present invention. The beam steering technique is simplified because no adjustments need to be made to account for different sizes or shapes of the three orthogonal coils as occurs in prior art systems. All of the measurements that are made by such beam steered devices, can be made with a device using the coil arrangement of the present invention.

Nonetheless, a new method of operation is preferred. This method includes a first series of steps to obtain a set or matrix of signal measurements, and a second series of steps to interpret the matrix of measurements. Generally speaking, the matrix of measurements is obtained by transmitting separate signals from each of the transmitter coils and receiving and recording the separate signals as they are received at each of the receiver coils. Where there are three transmitter coils and three receiver coils, there is received and recorded a matrix of up to nine measurements. After these signals are measured and recorded, it is then possible to process the signals so as to produce all of the measurements of dip, strike, resistivity and anisotropy as have been produced by prior systems. Indeed, this method of operation is so robust that it does not necessarily require the preferred arrangement of coils, and may advantageously use previously known coil arrangements.

There are several methods of making this matrix of measurements, but the preferred method of obtaining the matrix of, e.g., nine measurements is to energize the three transmitter coils (oriented at different angles) at slightly different frequencies, and to detect the three frequencies simultaneously in each of the three differently oriented receiver coils. If the transmitters are isolated so that each is energized with its own frequency, each receiver orientation will receive a composite of the three frequencies. If the receiver electronics can separate the three frequency components, they can separate the signal due to each of the three transmitter coils. By separating the three received frequencies received at each of the three receiver coils, nine separate signals can be provided. If the frequencies are sufficiently close together, the amount of skin-effect on measurements will be similar, and the three sets of measurements can be processed as if they were recorded at the same frequency.

It is difficult to design an analog filter that will discriminate between three frequencies that are very close together. If analog filters are selected, then adjustments for skin-effect would have to be made. However, the preferred method is to use frequencies that are very close to avoid skin-effect problems, and to use modern digital signal processors to separate the received signals. Such processors would also allow use of multiple frequencies in each transmitter coil so that a process such as taught in U.S. Pat. No. 5,781,436 issued to Forgang et. al. on Jul. 14, 1998 (hereby incorporated by reference) may be practiced.

The preferred transmission of signals through the formation is based on the method used in the high resolution array induction tool ("HRAI"). The specifics of the HRAI device are disclosed in U.S. Pat. No. 6,606,565, by inventors Robert Strickland and Gulamabbas Merchant, filed Dec. 14, 1999, which is owned by the assignee of the present invention. This application is incorporated by reference into this application for all purposes.

An induction tool built in accordance with a preferred embodiment of the invention will include a transmitter and a plurality of receivers. In order to simplify the electronics needed to process the received signal, it is preferred to digitize the receiver waveforms and to use digital signal processing to perform the phase-sensitive detection. A digital waveform generator drives the transmitter, which in turn stimulates a responsive signal in the receivers. This eliminates the heavy analog filtering required by the analog phase-sensitive detectors, which can form a substantial amount of electronics. Hence, a preferred embodiment of the present system includes a digital signal processor (DSP) that performs filtering and phase-detection downhole. In particular, a downhole digital signal processor (DSP) extracts the two phase components of each of the three transmitted frequencies from the composite signals received at each of the three receiver coils.

In order to obtain meaningful information from the received signals, it is necessary to make phase-sensitive measurements of the receiver voltages. This entails measuring the portion of the receiver voltage that is in-phase with the transmitter current. One preferred method is to measure both the transmitter current and receiver voltage with respect to an arbitrary phase reference and then divide the two complex voltages. To do this, it is necessary to measure in-phase and quadrature voltages with respect to the arbitrary phase reference.

Fast A/D converters and microcontrollers or DSPs are available to digitize the receiver waveform and to do the phase-sensitive detection digitally. The preferred embodiment of the present tool uses three frequencies. A novel, preferred method of stacking the waveforms and extracting the R (real) and X (imaginary) signals at three frequencies from the digitized waveform is described in detail as follows.

Let us first consider a single frequency and then generalize the results to multiple frequencies. In the preferred device, the transmitted frequency $f$ of the tool is chosen so that N samples from the A/D converter represent exactly M periods of the transmitted sine wave frequency $f$. The value N may therefore be defined as the number of accumulators or bins used to store sums of digitized samples of the analog signal received at each of the receiver coils. The value of M may similarly be defined as the number of complete cycles of the selected frequency that can be stored in N accumulator bins. It follows that the operating frequency is given by $$f = r\, M/N,$$

where M and N are integers, and r is the sampling rate at which the A/D converter outputs the digitized samples. According to the present technique, the waveform must be sampled at a rate that is at least twice the highest frequency of interest such that $f \leq r/2$ so as to satisfy the Nyquist criterion. Combining this with the above equation gives $M \leq N/2$. For the phase angle of every one of the N samples to be distinct, the values of M and N can have no common factor. If M>1, then there will be more than one period of the frequency of interest in the N accumulators. However, no two samples will have exactly the same phase angle with respect to the transmitted waveform so long as M and N have no common factors. With this relationship, every successive set of N samples will have exactly the same phase relationship to the transmitted sinusoid. Numerous sets of N samples can then be stacked or averaged together to produce an average waveform. This method reduces noise that is uncorrelated with the frequency of interest.

The stacking technique preferably takes place in a DSP. A stream of A/D samples is sent to the DSP continually at a rate of r samples per second. The stacking technique proceeds as follows. First, the N accumulators are initialized to zero. The first set of N samples from the A/D converter are added to the accumulators. That is, the first A/D sample is added to the first accumulator, and the second A/D sample is added to the second accumulator. This continues until each of the N A/D samples are added to their corresponding accumulators. The next set of N samples are then added to the accumulators as follows. The next sample, number N+1, is added to the first accumulator, and sample number N+i is added to the $i^{th}$ accumulator. Because of the relationship of N, M, and f the phase angles of all samples that have the same sample number modulo N are identical. This process continues until numerous sets of N samples have been summed into the accumulators. At the conclusion of an acquisition cycle, the DSP divides the total in each accumulator by the number of samples in that accumulator to produce an average value for that phase angle of the waveform. (There is a means of synchronizing acquisition so that the first A/D sample of each acquisition cycle always begins with the same phase with respect to the transmitted waveform.)

The preferred technique stacks a large number of waveforms to produce an averaged waveform. This averaged waveform can be plotted for diagnostic purposes if desired, but the primary goal is to measure the two phase components of the three frequencies of interest. After the stacking process, the N accumulator bins representing M cycles of the transmitted waveform can be reordered in order of increasing phase angle into one cycle of N distinct phase angles. This waveform is more finely sampled in phase by a factor of M. When it is desired to measure the real and imaginary components, R and X, of the transmitted frequencies, the following method may be used. To extract the R component of a frequency of interest $f$; the averaged waveform $x_i$ for the $i^{th}$ bin is multiplied by the sine of the angle $(2\pi\, i\, fM/N)$ where $f$ is the frequency of interest, and the product is summed.

$$V_R = \sum_{i=0}^{N-1} \sin\left(2\pi i f \frac{M}{N}\right) x_i \tag{1a}$$

$$V_X = \sum_{i=0}^{N-1} \cos\left(2\pi i f \frac{M}{N}\right) x_i \tag{1b}$$

By way of example only, the sine and cosine coefficients can be stored in a look-up table. This amounts to taking the dot product of the bin average vector and a "filter" vector containing the proper trigonometric function.

The HRAI uses two frequencies simultaneously. These share N=39. Different values of M allow one set of accumulators to serve for both operating frequencies. The values of M are 4 and 16. The A/D converter sampling rate r is 78.125 kHz. This results in operating frequencies of 8.0128205 and 32.051282 kHz. The waveform generator is filled with samples of a sum of sinusoids of these two frequencies.

According to one embodiment, it is desirable to use the same value of N for the three frequencies while using different values of M. Let us start with the 32 kHz frequency of the HRAI and investigate choices to yield three frequencies near 32 kHz. First, consider N=39. Possible values that could be used are $M_1=16$, and $M_2=17$. The choice for $M_3$ is problematical since 39 is divisible by 3, and the values of $M_3=15$ or $M_3=18$ cannot be used since they also have a common factor of 3. One solution is to choose a value of N that is prime. Then, any value of M will work. Consider N=79, which is prime. Then, any value of M will work. Consider N=79, which is prime. With a sampling rate of 78.125 kHz, the following values of M will produce the following frequencies.

| N | M | f, kHz |
|---|---|---|
| 79 | 32 | 31.645570 |
| 79 | 33 | 32.634494 |
| 79 | 34 | 33.623418 |

In this example, the frequencies are about 3% apart. The following example places the three frequencies about 1.5% apart.

| N | M | f, kHz |
|---|---|---|
| 157 | 64 | 31.8471338 |
| 157 | 65 | 32.3447452 |
| 157 | 66 | 32.8423567 |

A larger value of N allows frequencies even closer together.

One embodiment of the invention uses several sets of accumulators for several different values of N and M simultaneously. Consider the following set:

| N | M | f, kHz |
|---|---|---|
| 79 | 32 | 31.645570 |
| 39 | 16 | 32.051282 |
| 77 | 32 | 32.467532 |

These three frequencies differ by about only 1.3%.

Figure 13:
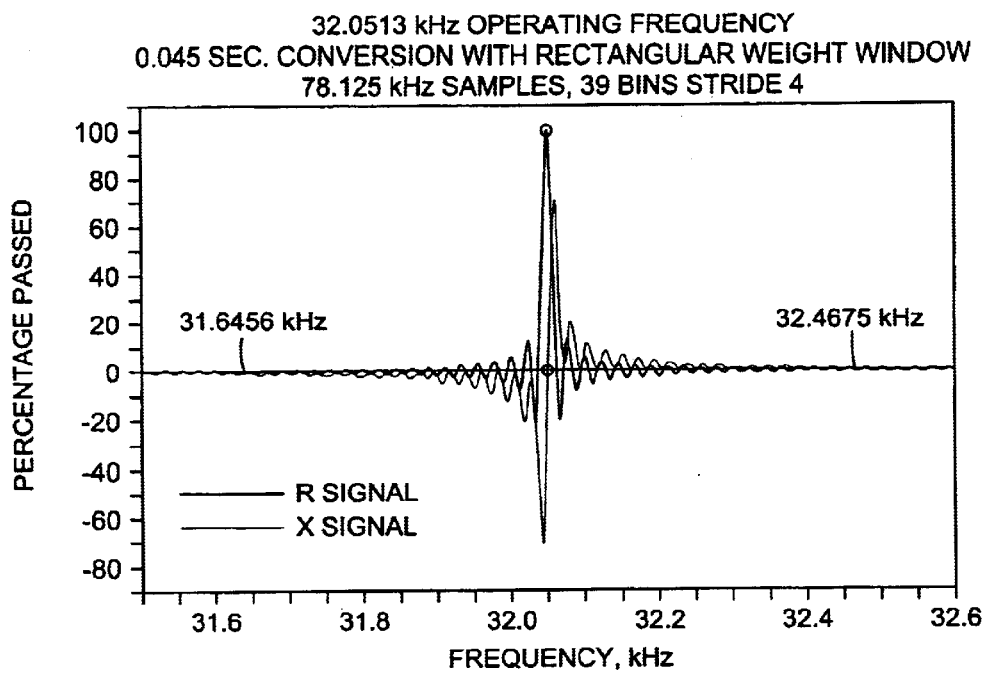
FIG. 13 illustrates the frequency response of a receiver detector tuned to 32.0513 kHz.

The frequency response of a system in accordance with these teachings may be examined assuming a 0.045 second acquisition cycle, where the detector is "tuned" to the center frequency, 32.0513 kHz. A computer program simulates the A/D converter sampling process, the accumulation, and the dot products. FIG. 13 shows the frequency response of this center-frequency detector to a pure sine wave of varying frequency. The plot shows the output of the 32.0513 kHz sine and cosine components (R- and X-signals) as a function of the input frequency. At precisely the frequency of the detector, the sine component is 100% and the cosine component is zero. For other frequencies, the system shows a band-pass response. At the other two frequencies of interest, the signal is attenuated to about 1%.

This 1% error signal represents one form of cross-talk whereby the measurement at one of the frequencies of interest is corrupted by the signals at the other frequencies. There are other forms of cross-talk. If the orientations of transmitters are not orthogonal, the vector projection of one transmitter onto the other will also result in cross-talk. Mutual coupling and capacitive coupling in the coils and wiring is another source. If the total cross-talk is significantly greater than 1%, there is probably little to be gained by further reducing the measurement system cross-talk. It is however relatively simple to further reduce the measurement system cross-talk with additional digital filtering.

The R-signal shows a well-defined bandpass response but with ripples on the shoulders. The width of the passband was found to be inversely proportional to the accumulation time. The accumulation time of approximately 0.045 msec represents exactly 90 sets of 39 samples. The frequency response was found to be approximated by the sin(x)/x function. The reason for this response is because the Fourier transform of a rectangular pulse in time is a sin(x)/x function in frequency. Since each set of 90 A/D converter samples in the measurement window is weighted equally, the weight rises suddenly from zero outside the window to a constant value for the duration of the time window and then back to zero. The ripples in the shoulders of the frequency response are an artifact of the constant weighting over a window in time.

The sin (x)/x frequency response is the Fourier transform of a rectangular window in the time domain. It is an artifact of the stacking method where each set of N measurements is weighted equally. If instead of a straight average of 90 (in the case of the HRAI) sets of N measurements, a weighted average is taken, the narrow bandwidth can be exchanged for a steeper cutoff and less ripple in the side bands. The weights or "window" should increase gradually with time up to a maximum and then decrease again gradually to zero. In particular, the weight varies in time but stepwise by groups of N samples. For example, during one measurement cycle the accumulators would first be cleared. The first set of N samples would each then be multiplied by the same weight and added to their respective N accumulators. The weight would then be updated. By looking up a next value from a table. The next set of N samples would each be multiplied by the current weight and added to their respective accumulators. This process repeats. The value of the weight will rise to a peak and then fall. At the conclusion of the measurement cycle, the values of the N accumulators are then divided by the sum of the weights. The weights are arranged so that they sum to one so that the value in an accumulator is a weighted average of all of the values for that phase. Each set of N samples is multiplied by the same weight. During the computation part at the end of a cycle, the accumulator bin number is continually updated so that the next time through, the samples will have the same phase with respect to the transmitted waveform.

In the field of spectral analysis, this is known as "data windowing." Numerous windows such as the cosine, raised cosine, and triangle are available. All of them involve various trade-offs between bandwidth and the height and distribution of ripples in the tails. One window, the Kaiser window, is known to have minimal energy in the side-lobes. It is given by $$w_i = \begin{cases} I_0\left[\alpha\sqrt{1-\left(\frac{2i}{N-1}\right)^2}\right]/I_0(\alpha), & -\frac{N-1}{2} \le i \le \frac{N-1}{2} \\ 0, & \text{otherwise} \end{cases} \quad (2)$$

where,

N=number of samples in the window

α=weighting parameter that controls the width of the window; and $I_0(x)$=the zeroth-order modified Bessel function.

Figure 14:
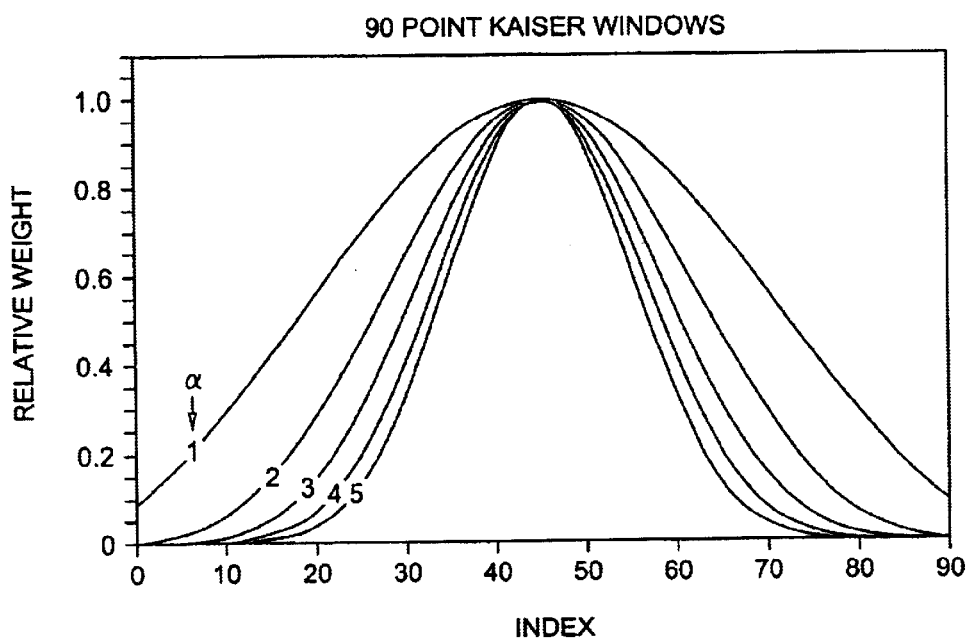
FIG. 14 illustrates the response of Kaiser windows of various orders.
Figure 15:
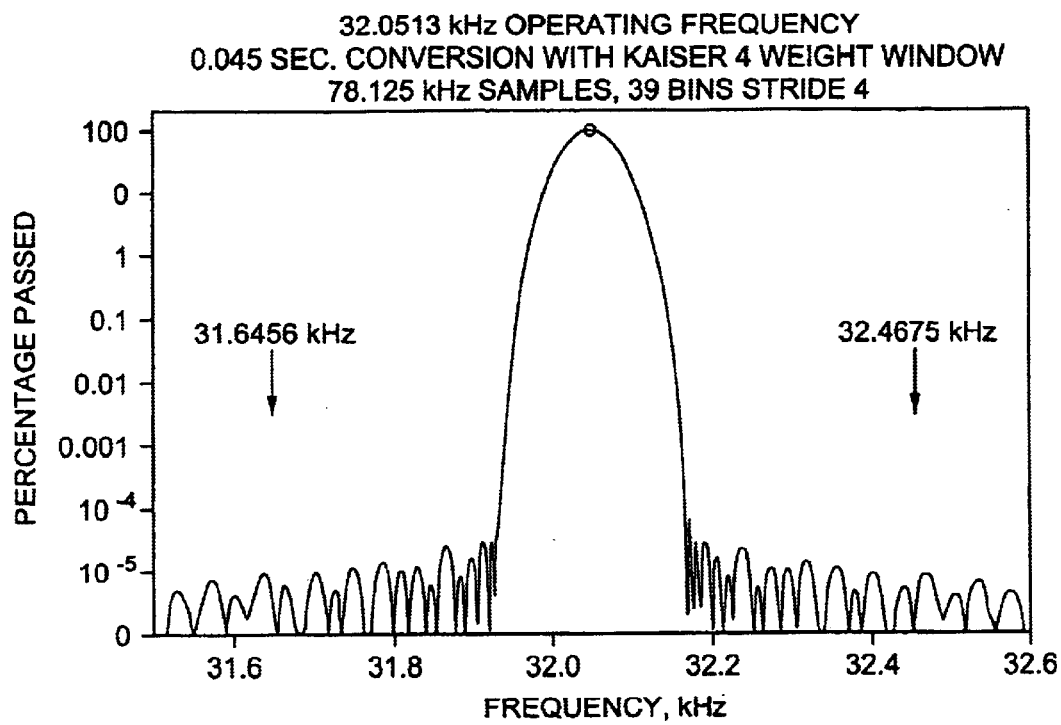
FIG. 15 illustrates the response of a Kaiser window of order 4.

FIG. 14 shows Kaiser windows of various values of the factor π. FIG. 15 shows the results of using a 90 sample Kaiser window with α=4. The two other operating frequencies are attenuated by a factor of nearly $10^7$. Other digital filters including filters that have notches at the other frequencies may be used. For instance, it is feasible to design a notch filter for each frequency that has zero response at the other two frequencies of interest.

Other operating frequencies might prove more applicable to a particular arrangement of coils. The method is not limited to three frequencies. It is also simple to add other frequencies. It might be useful to use a technique similar to the HRAI and have two frequencies for each orientation.

The method of the extended HRAI system has numerous advantages. For example, the measurement is nearly continuous, with the duty cycle approaching 100%. The only dead time is for periodic self-calibration, calculation, and transmission of the data. The frequencies can also be placed sufficiently close together so that all three orientations see the approximately the same skin-effect. Further, only one A/D converter channel per receiver coil orientation is needed to detect all three frequencies simultaneously. Other advantages include not needing the period of the transmitted signal to be an integer multiple of the sampling rate. Further, A/D converter samples need not be accumulated in memory but can be summed "on the fly." After the accumulation stage which can be done on the fly, comparatively little arithmetic remains to do the dot products. This reduces the amount of memory needed in the DSP. For diagnostic purposes, the method can produce a finely-sampled average waveform that has samples at phase increments that are smaller than the A/D converter sampling rate by a factor of M. Lastly, the accumulating stage can be done entirely in integer arithmetic without any loss of precision.

Other approaches also exist for obtaining a matrix of signal measurements. Another approach for obtaining the matrix of signal measurements is to make three logging passes through the zone of interest, energizing a different orientation of transmitter coil each trip through the formation of interest and measuring the coupling into all three orientations of receiver coils. There are three problems with this approach. The first is the problem of depth-aligning the data from the different logging passes. The second problem is that of tool rotation. The three passes will likely be at different azimuths making it difficult or impossible to process the data. The third problem is the extra time and expense required in traversing the well three times.

A third approach to obtain the matrix of measurements is to time-multiplex the three orientations of transmitters, energizing each orientation of transmitter rapidly in sequence. There are several problems with this approach. The first is that switching of the transmitter coil requires a period of time for the transmitter current to "ring down." For typical induction logging frequencies on the order of 10 kHz, this time is about 10 ms. The second problem is that of signal-to-noise ratio. Each of the three transmitter orientations can be energized for at most a third of the time. Accounting for the ring-down time could halve this resulting in a duty fraction of 6 or so. As compared to a continuous measurement, this would increase the noise by a factor of the square root of six.

Interpreting the Matrix of Measurements

After a set or matrix of measurements have been made of the received signals, a second series of steps may be utilized to process the measurements to determine horizontal resistivity, vertical resistivity, dip azimuth, and dip inclination.

Horizontal and vertical resistivities, $R_h$ and $R_v$ respectively, are measured parallel to and perpendicular to the bedding planes, respectively. The dip measured will be a regional or average dip instead of a feature-based dip. The algorithm assumes that the beds are parallel over the scale of several times the spacing. A sort of inverse technique is envisioned. The first step is to find dip inclination and azimuth. Then, $R_h$ may be found as a function of depth through conventional deconvolution techniques. $R_v$ can then be found through an inverse technique that iteratively refines the value of $R_v$ until the modeled logs match the measured logs. The dip estimation is not only useful itself but a necessary first step for an estimate of the anisotropy.

There are several methods of finding dip and strike (inclination and azimuth). Moran and Gianzero, "Effects of Formation Anisotropy on Resistivity Logging Measuring Measurements," *Geophysics*, Vol. 44, No. 7, July 1979, pp 1266–1286, gave an expression for the dip and strike for a hypothetical tool of zero spacing. Gianzero and Su, "The Response of an Induction Dipmeter and Standard Induction Tools to Dipping Beds," *Geophysics*, Vol. 55, No. 9, September 1990, pp. 1128–1140, showed that this formula works for small transmitter-to-receiver spacings. These references are hereby incorporated by reference.

Three formulas for the relative dip azimuth are provided in the beam steering discussion below. These formulas are general and will work for long spacings as well as short. They will also work with a multicoil tool using the in-phase component. No such closed-form solutions for the dip inclination have been found for finite spacings.

Another method of finding dip inclination is based on an empirical observation. It is known that when the tool is steered so that the dipoles are perpendicular to the bedding, the currents do not cross the boundaries, and the charge accumulation effects are minimized. It is further known that when the dipoles are steered in a direction parallel to the bedding, the charge accumulation effects are maximized, and the resulting logs have large horns at boundary crossings. Since the virtual tool can be steered in any orientation in space with the technique of beam-steering, one can consider an ensemble of logs with the tool pointed in any orientation with transmitters pointing parallel to receivers. The problem is to determine from the entire set of logs, the set with the least horns. Since an algorithm for dip azimuth is already known, this determination amounts to a one-dimensional search for the unknown dip inclination.

Figure 16:
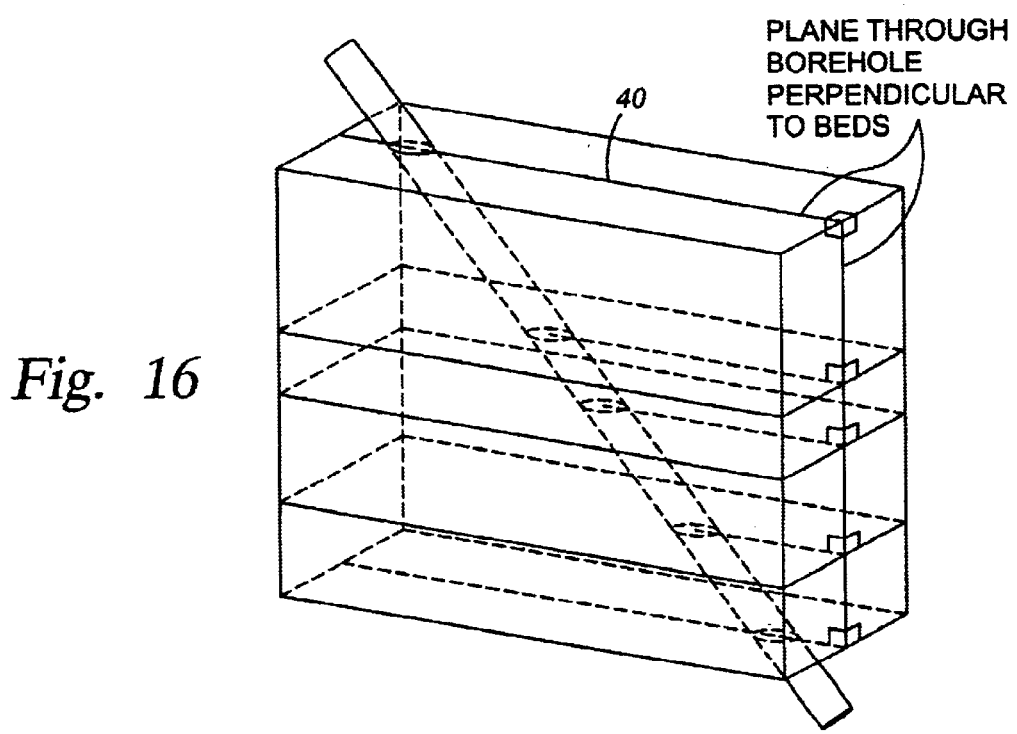
FIG. 16 is an illustration of a preferred orientation of the virtual sonde to simplify signal processing.

Although the virtual sonde can be rotated so that the transmitters and receivers point in any direction in space, one particular family of orientations is especially desirable. Imagine a plane constructed to intersect the borehole along the length of its axis rather like a sheet hanging from a clothesline. The clothesline represents the fixed borehole axis. The sheet can rotate about the clothesline so that the plane can point in any direction in azimuth. (Imagine a sheet blown horizontal by a strong wind.) Consider a borehole intersecting a series of parallel beds at an angle. Imagine the plane rotating until it is perpendicular to the bedding planes. If the direction vector of the virtual sonde is constrained to lie in this plane through the borehole perpendicular to the bedding, it can be shown by symmetry that four of the cross couplings between different transmitter-receiver orientations vanish. This plane 40 is illustrated in FIG. 16.

The reason the terms vanish is described mathematically in the beam steering discussion below. Since an expression for $\beta$, the relative dip azimuth, is known, the virtual sonde can be rotated azimuthally so that it lies in this plane. After this rotation, only the five nonzero couplings are needed to rotate the virtual sonde in the plane through the borehole normal to the bedding. There is a whole family of logs with the virtual tool pointed in any inclination in this plane.

It can be shown that the spatial frequency content varies as a function of the angle between the virtual sonde and the normal to the bedding planes. Because of the polarization horns, the logs produced with the virtual sonde pointed perpendicular to the bedding planes are much smoother than the logs produced when the virtual sonde is parallel to the bedding planes.

Some measure of log smoothness is therefore needed. There are several candidates for a smoothness metric. One can be derived from spatial power spectrum of the logs. The Fourier transform, FT, is a linear operator. That is, the FT of a linear combination of functions is identical to the linear combination of the FTs of the individual functions. Since the matrix rotation involves a linear combination of the coupling coefficients, the frequency response of the virtual sonde can be computed from the frequency response of the coupling coefficients. Since only five nonzero components are needed after the azimuthal rotation, only five fast Fourier transforms, FFTs, need be computed. The power spectrum for any inclination can be computed from these five nonzero FFTs. A metric can be constructed that is the ratio of the energy in a high-frequency band to the energy in a low-frequency band.

The result is to recast the problem to a one-dimensional function minimization problem. The problem is to find the dip inclination that minimizes the metric. Given a window of log centered about a depth of interest:

1. Compute the angle of relative dip azimuth;
2. Rotate the virtual sonde in azimuth until it lies in a plane that intersects the length of the borehole in a direction perpendicular to the bedding;
3. Compute the FFT of each of the five nonzero coupling coefficients;
4. For the current estimate of the dip inclination, compute the ratio of the power in the high-frequency band to the power in the low-frequency band; and
5. Rotate the inclination of the virtual sonde until the power ratio is minimized.

Another choice of metric might be to use the entropy of a section of log as a measure of polarization horns. When the virtual sonde is pointed perpendicular to the bedding, the resulting log should have minimum information and therefore maximum entropy. Dyos, "Inversion of Induction Log Data by the Method of Maximum Entropy," Paper T, *Transaction of the Society of Professional Well Log Analysts 28th Annual Logging Symposium*, Jun. 29–Jul. 2, 1987, showed how to calculate the entropy of a section of well log. The entropy is given by $$S(p, m) = -\sum_{i=1}^{N} p_i \ln(p_i/m_i) = \frac{f_i}{\sum_{j=1}^{N} f_j} \quad (3)$$

where the $f_i$ are the values of the log. The $m_i$ are typically set to unity.

Resistivity Estimation

When the virtual sonde rotates so that it is perpendicular to the bedding planes, the result is a log with no polarization horns since the currents do not cross boundaries between beds. The resulting logs should be amenable to deconvolution. The HRAI uses methods that combine convolutions of half-integer powers of the apparent conductivity. This technique should work well for the proposed 3-D tool. The method will require filter coefficients that vary with the angle of dip inclination, however. The result will be a log of $R_h$ that is substantially independent of dip inclination. Logs made at low angles of relative dip inclination will be higher in true vertical resolution that will be logs of high angles of dip. This is because a horizontal tool has no focusing perpendicular to the bedding planes.

The measurement of $R_v$ is more problematic and will likely involve an inverse technique. The polarization horns must be considered. One technique would be to use the location of polarization horns on the horizontal virtual tool as locations of the bed boundaries. With $R_h$ estimated from the deconvolved vertical virtual sonde, the problem would be to iteratively vary $R_v$ in each bed until the modeled horizontal virtual logs match the measured ones. As a first guess, the method could set $R_v = R_h$.

The Mathematics of Beam Steering

Gianzero and Su, "The Response of an Induction Dipmeter and Standard Induction Tools to Dipping Beds," *Geophysics*, Vol. 55, No. 9, September 1990, pp. 1128–1140, introduced the concept of a coupling matrix C that transforms the vector magnetic moment M of the transmitter coils into the vector magnetic field H at the receiver coils. The relationship is H=CM, or $$\begin{pmatrix} H_x \\ H_y \\ H_z \end{pmatrix} = \begin{pmatrix} C_{xx} & C_{xy} & C_{xz} \\ C_{yy} & C_{yy} & C_{yz} \\ C_{zx} & C_{zy} & C_{zz} \end{pmatrix} \begin{pmatrix} M_x \\ M_y \\ M_z \end{pmatrix} \quad (4)$$

The coordinate system is chosen to align with the bedding planes such that z is perpendicular to the bedding planes, and x points along the projection of the borehole axis onto the bedding plane. This is shown in FIG. 16 above. (Gianzero and Su picture a vertical borehole and dipping formation, but in both cases the axes align with the bedding planes.) The tool's coils align with another coordinate system x', y', z'. They demonstrate how to rotate the coupling matrix from the bedding (unprimed) system to the coil (primed) system using a matrix rotation technique. The method uses the similarity transform $$C' = R^{-1}CR \quad (5)$$

where the rotation matrix R is given by $$R = \begin{pmatrix} \cos\alpha\cos\beta & \cos\alpha\sin\beta & -\sin\alpha \\ -\sin\beta & \cos\beta & 0 \\ \sin\alpha\cos\beta & \sin\alpha\sin\beta & \cos\alpha \end{pmatrix} \quad (6)$$

and $R^{-1} = RT$. Likewise, the transform $$C = RC'R^{-1} \quad (7)$$

rotates from the coil system to the bedding system. They show that, in the bedding system, the coupling matrix degenerates to the sparse matrix:

$$C = \begin{pmatrix} C_{xx} & 0 & C_{xz} \\ 0 & C_{yy} & 0 \\ C_{zx} & 0 & C_{zz} \end{pmatrix} \quad (8)$$

Figure 5:
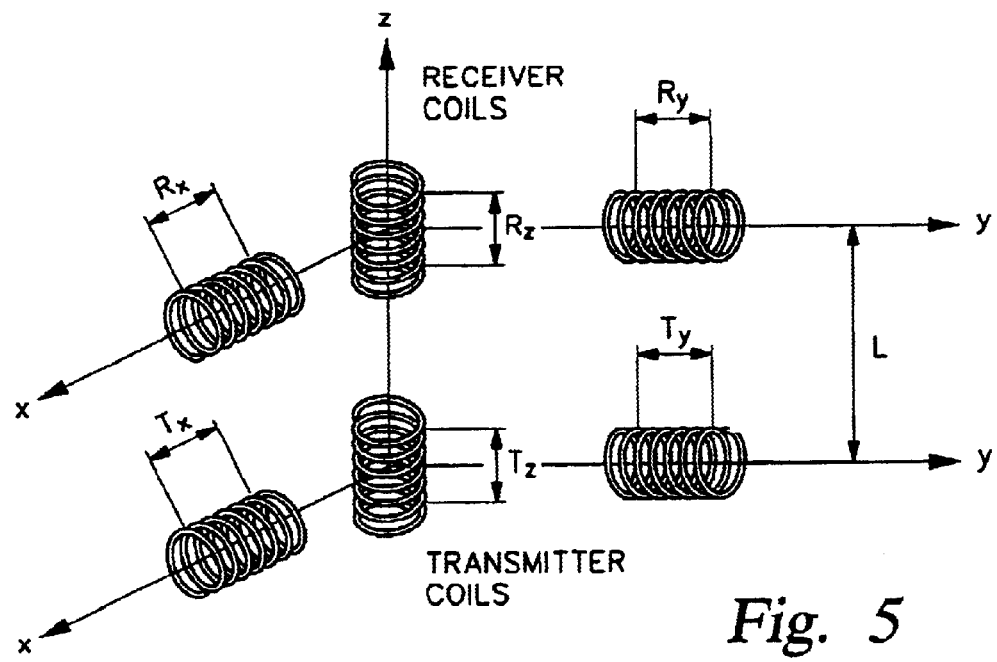
FIG. 5 is an illustration of a three dimensional coil array for use as the transmitter and receiver devices of the preferred embodiment.
Figure 6:
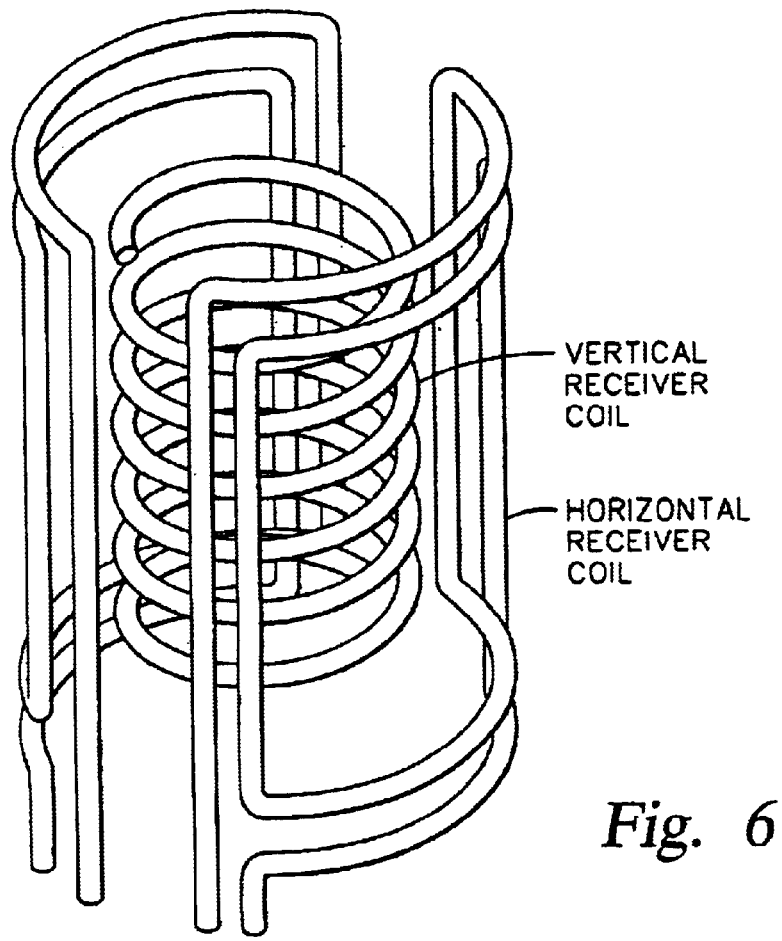
FIG. 6 is an illustration of an alternative coil arrangement for the transmitter and receiver coils.

In the same paper, they show how the individual measurements in the sonde system relate to the coupling coefficients in the bedding system. They present a diagram (FIG. 5, p. 1131) that shows how the magnetic moment from one orientation gets coupled into the different orientations of receivers.

Then they proceed to give expressions for the measurements made by some of the possible combinations of orientations of transmitters and receivers in terms of the coupling coefficients in the bedding system. The paper does not explicitly relate the $T_z R_x$ terms back to the coupling matrix in the coil system. This relationship may be found by following the steps indicated by their diagram. Here are the details of the mathematics for $T_z R_x$ that are implied by their block diagram.

$$T_z R_x = \left[ R^{-1}CR \begin{pmatrix} 0 \\ 0 \\ M_z' \end{pmatrix} \right] \cdot \begin{pmatrix} 1 \\ 0 \\ 0 \end{pmatrix} \quad (9)$$

$$= \left[ C' \begin{pmatrix} 0 \\ 0 \\ M_z' \end{pmatrix} \right] \cdot \begin{pmatrix} 1 \\ 0 \\ 0 \end{pmatrix} \quad (10)$$

-continued $$= \left[\begin{pmatrix} C'_{xx} & C'_{xy} & C'_{xz} \\ C'_{yx} & C'_{yy} & C'_{yz} \\ C'_{zx} & C'_{zy} & C'_{zz} \end{pmatrix} \begin{pmatrix} 0 \\ 0 \\ M'_z \end{pmatrix}\right] \cdot \begin{pmatrix} 1 \\ 0 \\ 0 \end{pmatrix} \quad (11)$$

$$= M'_z C'_{xz} \quad (12)$$

The first column vector is the magnetic moment of the z-directed dipole in the coil system. The dot product with the second unit column vector selects the $H'_x$ component. Note the interchange of the indices in the equation $T_z R_x = M'_z C'_{xz}$. Repeating this process for the other terms demonstrates that that the T-R matrix is proportional to C' since $T_z R_x = M'_z C'_{xz}$. Let us define the measurement matrix S such that $S_{xy} = T_y R_x$, for example. Thus, $$\frac{S}{M} = \frac{1}{M}\begin{pmatrix} T_x R_x & T_y R_x & T_z R_x \\ T_x R_y & T_y R_y & T_z R_y \\ T_x R_z & T_y R_z & T_z R_z \end{pmatrix} = R^{-1}CR = C'. \quad (13)$$

(We have dropped the prime on M by setting $M'_x = M'_y = M'_z = M$ following the notation of Gianzero and Su.) The magnetic moment M is no longer a vector because the $T_x$ terms are measured with a different vector magnetic moment than the $T_y$ terms. The individual terms of the measurement matrix are given by:

$$T_x R_x = \quad (14)$$
$$M\cos^2\beta[C_{xx}\cos^2\alpha + (C_{xz}+C_{zx})\cos\alpha\sin\alpha + C_{zz}\sin^2\alpha + C_{yy}\tan^2\beta]$$

$$T_x R_y = \quad (15)$$
$$\frac{M}{4}\sin2\beta[C_{xx} - 2C_{yy} + C_{zz} + (C_{xx} - C_{zz})\cos2\alpha + (C_{xz}+C_{zx})\sin2\alpha]$$

$$T_x R_z = \frac{M}{2}\cos\beta[C_{zx} - C_{xz} + (C_{xz}+C_{zx})\cos2\alpha + (C_{zz}+C_{xx})\sin2\alpha] \quad (16)$$

$$T_y R_x = T_x R_y \quad (17)$$

$$T_y R_z = \frac{M}{2}\sin\beta[C_{zx} - C_{xz} + (C_{xz}+C_{zx})\cos2\alpha + (C_{zz}+C_{xx})\sin2\alpha] \quad (18)$$

$$T_z R_x = \frac{M}{2}\cos\beta[C_{xz} - C_{zx} + (C_{xz}+C_{zx})\cos2\alpha + (C_{zz}+C_{xx})\sin2\alpha] \quad (19)$$

$$T_z R_y = \frac{M}{2}\sin\beta[C_{xz} - C_{zx} + (C_{xz}+C_{zx})\cos2\alpha + (C_{zz}+C_{xx})\sin2\alpha] \quad (20)$$

$$T_z R_z = \frac{M}{2}[C_{xx} + C_{zz} + (C_{zz}-C_{xx})\cos2\alpha - (C_{xz}+C_{zx})\sin2\alpha] \quad (21)$$

$$T_x R_x - T_y R_y = \quad (22)$$
$$\frac{M}{2}\cos2\beta[C_{xx} - 2C_{yy} + C_{zz} + (C_{xx} - C_{zz})\cos2\alpha + (C_{xz}+C_{zx})\sin2\alpha]$$

The corresponding terms agree with the results of Gianzero and Su, eq. 14–16, p. 1131. By inspection, $$\frac{T_y R_z}{T_x R_z} = \frac{T_z R_y}{T_z R_x} = \tan\beta \quad (23)$$

It is also straightforward to demonstrate that $$\frac{2T_x R_y}{T_x R_x - T_y R_y} = \tan2\beta. \quad (24)$$

This gives a method of determining the dip azimuth β directly from the matrix of measurements. Unfortunately, there is no obvious way to solve for the dip angle α. One technique that proved to be a dead-end was to was to find the α and β that produces a rotation matrix that causes the proper terms in C to vanish, producing a sparse matrix in the form of eq. 5. Closer examination revealed that the proper selection of β causes these terms to vanish independent of α. This means that if the virtual tool lies in the plane that passes through the length of the borehole axis perpendicular to the bedding, the same four terms will vanish regardless of the value of α. This is the orientation referred to in the discussion of FIG. 16. So long as the y' axis of the virtual sonde is arranged so that it is perpendicular to the borehole and parallel to the bedding, these four terms will vanish. This is true for any orientation that aligns the y' axis of the sonde with the y axis of the formation.

Not all of the couplings are independent. It is possible, for instance to solve for all of the terms involving $T_y$ in terms involving $T_x$ and $T_z$.

$$T_y R_y = T_x R_x + T_x R_y \left[\frac{T_z R_y}{T_z R_x} - \frac{T_z R_x}{T_z R_y}\right] \quad (25)$$

$$T_y R_x = T_x R_y \quad (26)$$

$$T_y R_z = \frac{T_x R_z T_z R_y}{T_z R_x} \quad (27)$$

Eq. 25 is identical to eq. 16. Eq. 27 follows directly from eq. 23. Eq. 26 is the result of inserting the expressions for tan β and tan 2β (eq. 20–21) into the standard trigonometric identity $$\tan 2z = \frac{2\tan z}{1 - \tan^2 z} \quad (28)$$

where z is an arbitrary angle.

This means that three of the nine elements of the measurement matrix are redundant. By rearranging terms, one can solve for any of the x or y rows or columns of the measurement matrix. This implies that two orientations of transmitters and three orientations of receivers are sufficient to make six of the measurements directly, and the "missing" three can be found in terms of these six. Likewise, three orientations of transmitters and two orientations of receivers are sufficient.

These results have implications for an array tool with multiple spacings of triads (or couples). Consider an array tool with a single couple of transmitters and multiple spacings of receiver triads (a couple is just a triad with one orientation omitted). A measurement channel is dedicated to each orientation of each coil. For a tool with three receiver sets of triads, two channels are needed for the transmitters plus three for each receiver spacing for a total of eleven channels. Now consider using a triad of transmitter coils and three couples of receivers. Three channels are needed for the transmitters but only six for the receivers for a total of nine channels. One transmitter triad and four receiver spacings of triads would require eleven channels. For an array tool with a single transmitter location and multiple receiver spacings, from the standpoint of wiring and receiver channels, it is more economical to have a triad of transmitter coils and couples of receiver coils. Although it is possible to solve mathematically for the missing orientation, the process is based on the assumptions in the model. These include point coils, no borehole, and parallel bedding. In real-life situations, there might be additional information from the other orientation. It is probably wise to include all three orientations of transmitters and receivers in the first prototype device. If field testing shows that one orientation is redundant, future devices could be constructed with four spacings with the same number of channels (with one left over for a z-axis accelerometer).

Once the matrix of up to nine signals has been recorded, the known steering techniques may be used in a data processing system to produce logs of resistivity, anisotropy, dip, strike, etc. Depending on which measurements or logs are desired, it may not be necessary to use all nine matrix measurements and therefore it may not be necessary to record them all. If desired, a simple summation of signals may be made in real time at the wellhead to produce a simple log corresponding to what would be measured by a device with single vertically oriented coils. This would be useful as a quality check to be sure the system is functioning properly, although it would not be as accurate as results which can be obtained from more detailed processing of the recorded data.

While a preferred embodiment of the present invention has been shown and described, it is clear that various modifications could be made to the apparatus and method without departing from the scope of the invention as defined by the following claims.

What is claimed is:

1. A method of induction well logging comprising:
   transmitting a first signal at a frequency $f_1$ from a first transmitter coil;
   transmitting a second signal at a frequency $f_2$ from a second transmitter coil;
   transmitting a third signal at a frequency $f_3$ from a third transmitter coil;
   wherein each of said first, second, and third transmitter coils is energized with its own distinct input signal and wherein said first, second, and third coils comprise one or more elliptical conductive loops, each lying in a plane tilted substantially from the principal axis, each coil positioned symmetrically, about the principal axis, and each coil being centered on substantially the same point;
   receiving said first, second, and third signals at a receiver coil arrangement comprising three coils, each coil comprising one or more elliptical conductive loops, each loop lying substantially in a plane tilted substantially from the principal axis, each coil positioned symmetrically about, the principal axis, and each coil being centered on substantially the same point to receive said first, second and third transmitter signal; and
   recording each of the received signals,
   wherein said transmitted signals are generated by a digital waveform generator and said received signals are sampled at a rate r selected so that sampled signals are locked in phase with said transmitted signals;
   and further wherein $N_1$ successive samples of said received signal are stored in a first set of accumulators, where $N_1$ is an integer;
   $N_2$ successive samples of said received signal are stored in a second set of accumulators, where $N_2$ is an integer; and
   $N_3$ successive samples of said received signal are stored in a third set of accumulators, where $N_3$ is an integer;
   wherein said frequency $f_1$ is selected so that $M_1$ complete cycles of said first signal are contained in said first set of accumulators, where $M_1$ is an integer, where $f_1 = rM_1/N_1$, $N_1/M_1 \geq 2$, and where $M_1$ and $N_1$ have no common factors;
   wherein said frequency $f_2$ is selected so that $M_2$ complete cycles of said second signal are contained in said second set of accumulators, where $M_2$ is an integer, where $f_2 = rM_2/N_2$, $N_2/M_2 \geq 2$, and where $M_2$ and $N_2$ have no common factors; and
   wherein said frequency $f_3$ is selected so that $M_3$ cycles of said third signal are contained in said third set of accumulators, where $M_3$ is an integer, where $f_3 = rM_3/N_3$, $N_3/M_3 \geq 2$, and where $M_3$ and $N_3$ have no common factors.

2. The method of claim 1, wherein $N_1 = N_2 = N_3$ and said first, second, and third set of accumulators is the same set of accumulators.

3. The method of claim 1, wherein said first, second, and third set of accumulators are different sets of accumulators.

4. The method of claim 1, wherein said received signals are sampled by a digital signal processor.

5. The method of claim 1, wherein said received signals are each a composite of said first, second, and third signals transmitted from the transmitter coils, and further wherein a digital signal processor extracts the two phase components of each of the three transmitted frequencies from the composite signals received at each of the three receiver coils.

6. The method of claim 1, wherein said $N_1$, $N_2$ and $N_3$ samples are stored in one or more accumulators.

7. The method of claim 1, wherein $N_1$, $N_2$, and $N_3$ successive samples is each multiplied by a weighting factor prior to being added to said first, second, and third set of accumulators, respectively.

8. The method of claim 7, wherein said weighting increases with time up to a maximum and then decreases to zero.

9. The method of claim 7, wherein said weighting is according to the equation $$w_i = \begin{cases} I_0\left[\alpha\sqrt{1-\left(\frac{2i}{N-1}\right)^2}\right] / I_0(\alpha), & -\frac{N-1}{2} \leq i \leq \frac{N-1}{2} \\ 0, & \text{otherwise} \end{cases} \quad (2)$$

where
   N = number of samples m the window
   $\alpha$ = weighting parameter that controls the width of the window; and
   $I_0(x)$ = the zeroth-order modified Bessel function.

10. A method of induction well logging comprising:
   transmitting a first signal at a frequency $f_1$ from a first transmitter coil;
   transmitting a second signal at a frequency $f_2$ from a second transmitter coil;
   transmitting a third signal at a frequency $f_3$ from a third transmitter coil;
   wherein said transmitting steps create a virtual sonde, each of said first, second, and third transmitter coils being energized with its own distinct input signal that differs from the others and wherein said first, second, and third coils comprise one or more elliptical conductive loops, each lying in a plane tilted substantially from the principal axis, each coil positioned symmetrically about the principal axis, and each coil being centered on substantially the same point;

receiving said first, second, and third signals at a receiver coil arrangement comprising three coils, each coil comprising one or more elliptical conductive loops, each loon lying substantially in a plane tilted substantially from the principal axis, each coil positioned symmetrically about the principal axis, and each coil being centered on substantially the same point to receive said first, second and third transmitter signal;

recording each of the received signals; and processing the received signals to generate information representing characteristics of materials surrounding the well, further wherein said processing includes calculating dip inclination by, computing the angle of relative dip azimuth;

rotating the virtual sonde in azimuth until it lies in a plane that intersects the length of the borehole in a direction perpendicular to the bedding;

computing the discrete Fourier transform of each of five nonzero coupling coefficients;

computing the ratio of the power in the high-frequency band to the power in the low-frequency band for a plurality of estimated dip inclinations; and selecting the estimated dip inclination having the minimum power ratio as the true dip inclination.

11. The method according to claim 10 wherein the three transmitted induction signals have three separate frequencies and are transmitted simultaneously.

12. The method of claim 10, wherein said processing uses the equation:

$$\frac{2T_x R_y}{T_x R_x - T_y R_y} = \tan 2\beta.$$

13. The method of claim 10, further comprising:

tabulating three sets of measurements from signals transmitted from said first, second, and third coils to derive a matrix of 9 measurements.

14. The method of claim 13, wherein said 9 measurements represents every transmitter-receiver orientation.

15. The method according to claim 10 wherein each of said transmitted signals is received at each of said receiving coils and said three frequencies are separated and recorded as separate signals.

16. The method according to claim 15 wherein said received signals are digitized, the digitized samples are stored, and the frequencies are separated by taking the dot products of the stored samples with a trigonometric function representing each of the transmitted frequencies.

17. The method according to claim 15 wherein said signals includes virtually combining and rotating said recorded signals to produce outputs signals equivalent to those produced by a transmitted signal parallel to and perpendicular to earth formations surrounding the well.

18. A method of induction well logging, comprising:

transmitting a first signal at a frequency $f_1$ from a first transmiter coil;

transmitting a second signal at a frequency $f_2$ from a second transmitter coil;

transmitting a third signal at a frequency $f_3$ from a third transmitter coil;

receiving said first, second, and third signals at a receiver coil arrangement;

sampling said first, second and third signals at a rate r;

measuring conductivity for a formation between said transmitter coils and said receiver coil arrangement;

wherein successive samples of said first signal are added to and stored in a first set of N data storage locations;

wherein successive samples of said second signal are added to and stored in a second set of N data storage locations;

wherein successive samples of said third signal are added to and stored in a third set of N data storage locations;

further wherein $f_1$, $f_2$, and $f_3$ each satisfy the equation $f = rM/N$ where $f$=selected frequency;

M=the integer number of complete cycles of the selected frequency $f$ that can be stored in N data locations;

N=the integer number of data locations;

r=the sampling rate;

and further wherein $f \leq r/2$, $N/M \geq 2$, and M and N have no common factors.

19. The method of claim 18, wherein all of the frequencies of all of the transmitted signals are within three percent of each other.

20. The method of claim 18, wherein all of the frequencies of the transmitted signals are within one and one-half percent.

21. The method of claim 18, wherein the value for N remains constant for each different frequency while the value of M varies depending on frequency.

22. The method of claim 18, wherein the values for N vary, and the values for M vary, depending on frequency.

23. The method of claim 18, wherein a weighted average of said samples in said first set of N data storage locations is taken.

24. The method of claim 18, wherein said samples are weighted according to the equation $$w_i = \begin{cases} I_0\left[\alpha\sqrt{1-\left(\frac{2i}{N-1}\right)^2}\right] \Big/ I_0(\alpha), & -\frac{N-1}{2} \leq i \leq \frac{N-1}{2} \\ 0, & \text{otherwise} \end{cases} \quad (2)$$

where,

N=number of samples in the window

α=weighting parameter that controls the width of the window; and $I_0(x)$=the zeroth-order modified Bessel function.

* * * * *